April 29, 1941.  E. BURMEISTER  2,240,172

AUTOMATIC LUBRICATION OF BEARINGS ON CRANKPINS

Filed Oct. 20, 1938  3 Sheets-Sheet 1

Inventor
Erich Burmeister
by Knight Bros
Attorneys

April 29, 1941.    E. BURMEISTER    2,240,172
AUTOMATIC LUBRICATION OF BEARINGS ON CRANKPINS
Filed Oct. 20, 1938    3 Sheets-Sheet 2

Inventor
Erich Burmeister
by Knight Bros
attorneys

Fig. 5.

Patented Apr. 29, 1941

2,240,172

UNITED STATES PATENT OFFICE 2,240,172

AUTOMATIC LUBRICATION OF BEARINGS ON CRANKPINS

Erich Burmeister, Essen, Germany, assignor to Fried. Krupp Aktiengesellschaft, Essen-on-the-Ruhr, Germany Application October 20, 1938, Serial No. 236,019 In Germany November 1, 1937

14 Claims. (Cl. 74—605)

The invention relates to a method of and to means for automatically lubricating the bearings of connecting or coupling rods on crankpins, in particular with locomotives. The invention has for its object to obtain a simple, efficacious, and reliable automatic lubrication of bearings of this type and, further, to reduce the consumption of lubricating oil to a minimum. This object is achieved according to the invention primarily by a system whereby the lubricating oil not only is fed from the interior of the hollow crankpin to the supporting faces of the bearing by centrifugal force, but also is caused to flow back from these faces to the interior of the crank pin likewise under the influence of centrifugal force.

Figure 1:
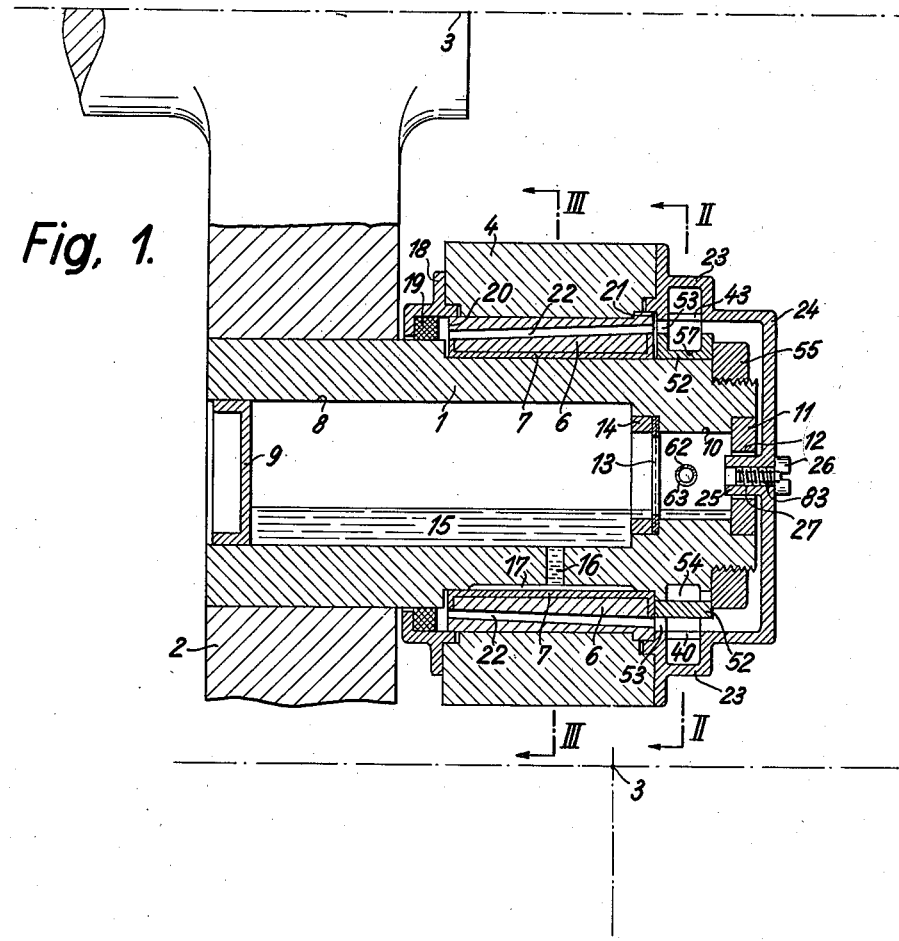
Figure 2:
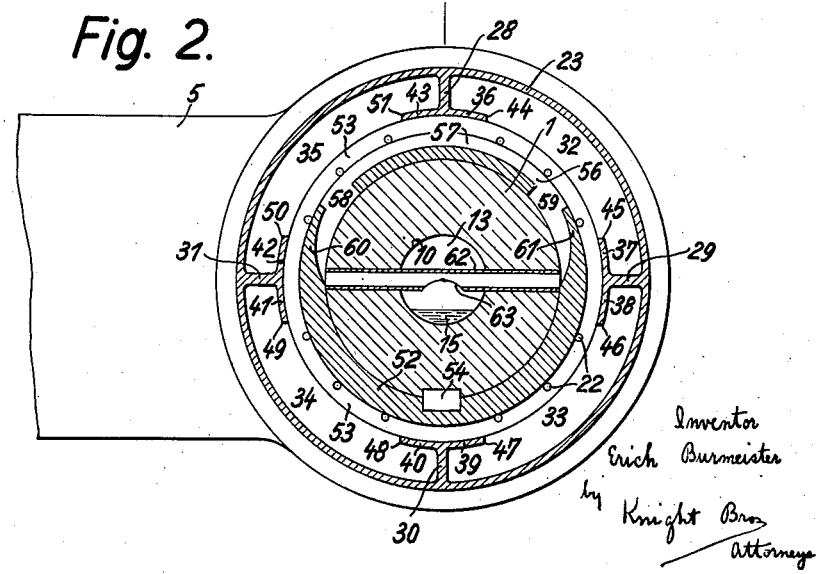
Figure 3:
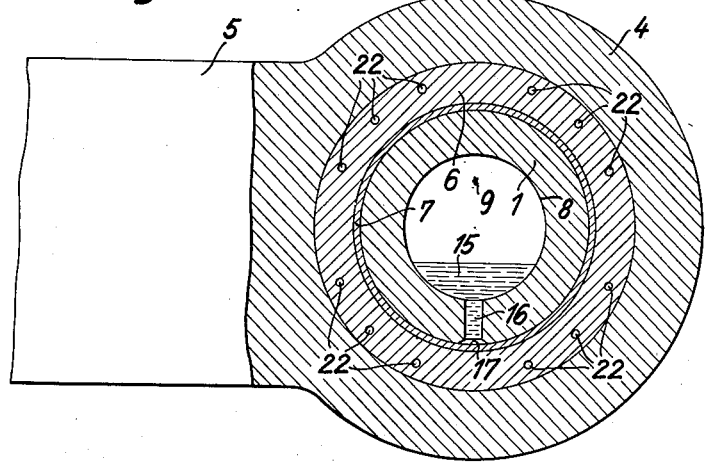

In order that the invention may be clearly understood and readily carried into effect, two preferred embodiments of the same are represented by way of example in the accompanying drawings, in which Figure 1 is a longitudinal section of the crankpin of a driving wheel of a locomotive, with the head of a coupling rod mounted thereon, Figure 2 is a section on line II—II of Figure 1, Figure 3 is a section on line III—III of Figure 1.

Figure 4:
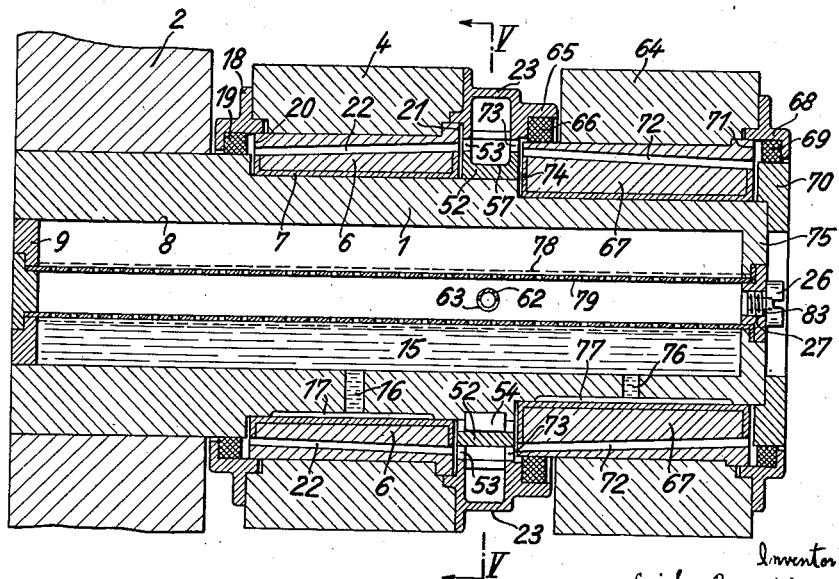
Figure 5:
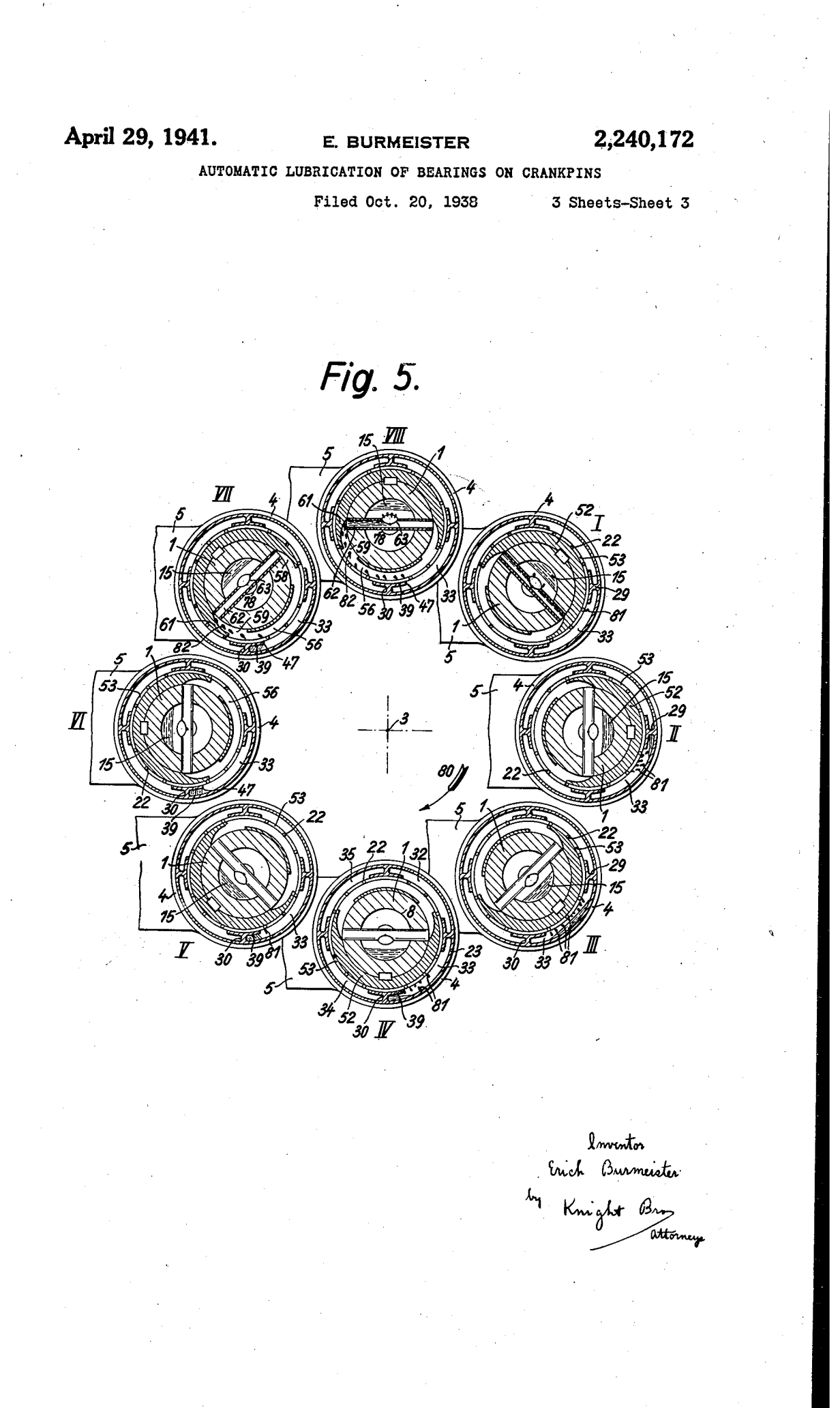

Figure 4 is a longitudinal section of a crankpin and two heads of rods mounted thereon, viz. the head of a coupling rod and that of a connecting rod, Figure 5 shows on reduced scale sections on the line V—V of Figure 4 with the crankpin in different positions during its revolution.

Similar parts are denoted by similar reference numbers.

The embodiment illustrated in Figures 1-3 will be described first.

The crankpin 1 is fixed in known manner to the disc 2 of a driving wheel the center line of which is marked by the chain-dotted line 3. The pin 1 has mounted on it the head 4 of a coupling rod 5 by means of a bush 6 fixed to the head 4. The bush is babbitted in known manner at 7.

The crank pin 1 has a coaxial bore 8 the diameter of which is about half that of the portion of the pin resting in the wheel disc 2. The rear end of the bore 8 is covered by a disc 9. Toward the free end of the crankpin 1 the bore 8 goes over into a smaller bore 10 coaxial therewith. This bore 10 is closed on the outside by a disc 11 provided in the end face of the crankpin 1, up to a small bore 12 coaxial with the bores 8 and 10 of the crankpin. The bore 10 is separated from the bore 8 by a sieve 13 fixed by means of a ring nut 14. The bores 8 and 10 contain a supply of lubricating oil, as marked by 15, the level of which is at a greater distance from the center line 3 of the driving wheel 2 than the surface line of the small bore 12 most remote from the line 3. A channel 16 leads from that surface line of the bore 8 which is farthest distant from the center line 3, in the direction of a diameter away from the line 3 and opens in the midst between the end faces of the bush 6 into an oil groove 17 extending parallel to the axis of the crankpin 1.

The head 4 of the coupling rod has fixed to it on the side turned toward the wheel 2 a ring 18 of angular section which embraces a packing 19 consisting for example of rings or cups of synthetic rubber. The inner end face 20 of the bush 6 communicates with the outer end face 21 by channels 22 provided within the bush 6 and the distance of which from the center line of the crankpin 1 increases with increasing distance from the end face 20.

The head 4 of the coupling rod has further fixed to it, on its side remote from the wheel 2, an oil collecting ring 23 which surrounds the crankpin 1 and is provided with a cap 24 which completely covers the free end of the crankpin. An oil-filling socket 25 is provided in the cap 24 coaxially with the crankpin 1 and passes through the small bore 12, the bore 27 of the socket 25 being closed by a screw plug 26. Instead of the plug 26 also an inwardly opening self-closing valve may be provided.

The hollow oil collecting ring 23 is concentric with the crankpin 1 and its smallest internal diameter is greater than the diameter of the crankpin 1 at this place. The collecting ring 23, further, has rectangular cross section and is subdivided by four partitions 28—31 so as to form four quadrant chambers 32—35, Figure 2. These chambers along the greater part of their length are open toward the crankpin 1, only the extremities of each chamber being covered toward the crankpin 1 by projections 36—43 which issue from the partitions 28—31 and are cylindrically curved according to the smallest diameter of the hollow collecting ring 23. The free edges of the projections 36—43, denoted by 44—51 constitute overflow edges.

The oil collecting ring 23 surrounds not only the crankpin 1, but also a ring 52 mounted on the latter, a circular gap 53 being left between the ring 52 and the collecting ring 23 which gap faces the openings of the channels 22 on the end face 21 of the bush 6. The ring 52 by a spline 54 resting in the crankpin 1 is prevented from rotation and by a nut 55 from axial movement toward the free end of the crankpin. The ring 52 has further a recess 56 which extends on its whole half fully facing the center line 3 and the middle section 57 of which forms a groove facing the collecting ring 23 and goes over toward the ends of the recess 56 into two pockets 58 and 59. These pockets are open toward the crankpin 1 and are formed by beak-like projections 60 and 61, respectively. The cross section of the recess 56 is rectangular and its width is equal to the internal width of the collecting ring 23. Along that diameter of the cross section of the crankpin 1, Figure 2, which is normal to the crank radius (line connecting the center line 3 of the wheel with the center of the pin 1) a tube 62 passes through the crankpin 1 and opens into the respective two pockets 58 and 59. The tube 62 has an aperture 63 situated in the center of the bore 10 and remote from the center line 3 of the wheel 2.

In the embodiment according to Figure 4 the crankpin 1 has mounted on it side by side both the head 4 of a coupling rod and the head 64 of a connecting rod. The parts 6, 7 and 16—22 allotted to the head 4 are constructed exactly like the corresponding parts of the embodiment according to Figures 1–3. In the same manner as in this first embodiment the head 4 of the coupling rod has fixed to it on its side remote from the wheel 2, that is, between the head 4 of the coupling rod and the head 64 of the connecting rod, an oil-collecting ring 23 which differs from the ring 23 of the first-described embodiment according to Figures 1–3 merely by the fact that it comprises, instead of the cap 24, an annular projection 65 which encloses a circular packing 66. This packing may likewise be formed by rings or cups of synthetic rubber and encloses the bush 67 of the heads 64 of the connecting rod which bush projects inwardly beyond the head 64. The collecting ring 23 surrounds a ring 52 resting on the crankpin 1 and having the same configuration as the corresponding ring 52 of the first embodiment and the pockets of which, in the above-described manner, communicate through a tube 62 with the interior of the crankpin 1. The head 64 of the connecting rod on its side remote from the wheel 2 comprises an annular packing 69 enclosed in an angular ring 68 and surrounding a disc 70 mounted on the free end of the crankpin 1. Channels 72 issue from the outer end face 71 of the bush 67 the distance of which channels from the center line of the crankpin 1 increases toward the collecting ring 23 and which open into the end face 74 of the bush 67 in front of a circular gap 73 existing between the collecting ring 23 and the ring 52. The bore 8 of the crankpin 1 extends up to below the head 64 of the connecting rod and is closed on the free end of pin 1 by the end wall 75 of the latter. A channel 76 extending parallel to the channel 16 connects the bore 8 with that part of the bush 67 which is remote from the center line 3 of the wheel, through the intermediary of an oil groove 77 provided in the crankpin 1. Instead of the flat sieve 13 according to Figure 1 a cylindrical sieve 78 is provided in this embodiment which sieve is supported by a perforated tube 79 coaxial with the crankpin 1. The extremities of the tubular sieve 78 and of the supporting tube 79 are fixed to the disc 9 covering the bore 8 and in the end wall 75. A bore 27 provided in the end wall 75 and closed by a plug screw 26 opens within the sieve 78 into the bore 8. The aperture 63 of the tube 62 is situated likewise within the sieve 78.

In describing the mode of operation of the lubricating arrangement hereinbefore described it may be assumed that the crankpin 1 revolves in the direction of the arrow 80, Figure 5. In this rotation the coupling rod 5 maintains its horizontal position and the connecting rod moves only slightly out of the horizontal position so that the crankpin 1 executes a rotary motion relatively to the head 4 of the coupling rod and to the head 64 of the connecting rod. That position of the crankpin 1 which is one eighth of a revolution above the right-hand dead center position of the crankpin, is denoted by I. The remaining seven positions of the crankpin 1 are denoted by II—VIII, following the direction of the arrow 80. Under the action of the centrifugal force the pool of oil in the bore 8 presses against that side of the bore 8 which is remote from the center line 3 of the driving wheel, the oil level adjusting itself approximately normal to the crank radius. Oil arrives, then, from the oil reserve 15 through the channels 16 and 76 and through the intermediary of the oil grooves 17 and 77 at the bushes 6 and 67. The rotary motion which the crankpin 1 executes relatively to the bushes, in known manner produces an oil film along the periphery of the crankpin which oil film in the present arrangement is particularly easily formed since the oil existing between the surfaces of the bearing is under pressure, owing to the action of the centrifugal force, and the feed of the oil to the bearings takes place at the point of the smallest bearing pressure.

The oil escaping from the bearing of the coupling rod and connecting rod on the end faces 21 and 74, remote from the collecting ring 23, of the bushes 6 and 67, arrives, under the influence of the centrifugal force, through that part of the annular gaps 53 and 73 which is remote from the center line 3, in one of the chambers 32—35 of the oil collecting ring 23. The oil escaping from the bearings on those end faces 20 and 71 of the bushes 6 and 67 which are remote from the collecting ring 23 is driven by centrifugal force through those channels 22 and 72 which are situated in the portion just remote from the center line 3 of the bushes 6 and 67, and through the circular gaps 53 and 73 into one of the chambers 32—35.

In the following is considered the flow of the lubricating oil with reference to the chamber 33.

In the position I this chamber is situated on the right-hand side of the ring 52, seen from the center line 3. If a punctiform source of light were located at the center line 3, only one half of the chamber 33 would lie in the shade of the ring 52 in the position I. Only this half takes up oil from the circular gaps 53 and 73, and in fact, due to the small distance from the boundary of the imaginary shade of ring 52, only a very small quantity, as marked by the drop 81. The more the chamber 33 in the subsequent positions of the crankpin 1 immigrates into the imaginary shade of the ring 52, the larger is the supply of oil from the circular gaps 53 and 73. The largest quantity of oil is taken up by the chamber 33 in the position III in which its midst has the farthest distance from the center line 3, as marked by the drops 81. In proportion as the chamber 33 in the following positions again moves out of the shade of the ring 52, the oil supply from the circular gaps 53 and 73 decreases, until in the position VI the supply is zero. The oil supplied collects always in that portion of the chamber 33 which is farthest distant from the center line 3. Consequently, the oil flows from that end of the chamber 33 (position II) which is bounded by the partition 29 to the end bounded by the partition 30 (position IV). Under the influence of the centrifugal force the oil level in the chamber 33 adjusts itself in all positions of the chamber nearly normally to the crank radius. The oil level therefore goes over from the position nearly normal to the partition 30 according to position IV into a position nearly parallel to the partition 30, see position VI. When this takes place, the oil level rises on the partition 30 until it arrives at the projection 39 along which it flows until it reaches in the position VI the overflow edge 47. In the following position VII, in which the chamber 33 is situated on that side of ring 52 which is turned toward the center line 3 and thus is opposite the recess 56, the oil flows beyond the overflow edge 47 and is thrown by centrifugal force into the recess 56, as marked by the drops 82. In the tendency to remove as far as possible from the center line 3, the oil enters the pocket 59 and is led by the beak 61 into the tube 62 from which it arrives through the aperture 63 in the bore 8 of the crankpin I and thus restores the oil stock 15 therein. On this route the oil passes through the sieve 78 which retains any solid impurities. In the position VIII, finally, the remainder of the oil is delivered from the chamber 33 into the bore 8.

In the same manner as in the chamber 33 the oil escaping during the rotary motion of the pin I from the bearings of the two rods is collected in the remaining chambers 32, 34, and 35 and is delivered to the recess 56 leading into the interior of the crankpin I.

Since every chamber of the collecting ring 23 has symmetrical configuration relatively to its middle line and the recess 56 is situated symmetrically to the crank radius, the described arrangement operates equally well in both directions of rotation.

During standstill of the driving wheel 2, in any position of the crankpin I of the oil reserve 15 cannot escape, since the aperture 63 of the tube 62 is situated in the center of the bore 8 of the crankpin I.

The bore 27 serves to supply oil to the bore 8. Any solid impurities of the oil are retained by the sieve 13 or 78, respectively. Advantageously a pressure equalizing aperture 83 is provided in the screw plug 26, so that with variations of temperature an equalization of the pressure can take place between the air existing within the bearing and the outer air.

What I claim and desire to secure by Letters Patent is:

1. In a device of the class described, a crankpin mounted to revolve about an external axis, a connecting rod bearing within which said crankpin is journalled, said crankpin having an oil reservoir therein, a supply conduit for conducting oil flowing under the influence of centrifugal force from said reservoir to the bearing surfaces of said crankpin and said connecting rod bearing, and a return conduit extending from the outer surface of said crankpin to said reservoir for returning oil to said reservoir; said connecting rod bearing having associated therewith hollow means for collecting oil escaping from said bearing surfaces, said hollow means being open to the crankpin at its inner side and being provided with at least one inwardly extending wall to catch the collected oil therein and to move the collected oil to a position where it will flow by centrifugal force inwardly to said return conduit, said return conduit being adapted to admit the oil returning under centrifugal force to said reservoir.

2. In a device of the class described, a crankpin mounted to revolve about an external axis, a connecting rod bearing within which said crankpin is journalled, said crankpin having an oil reservoir therein, a supply conduit for conducting oil flowing under the influence of centrifugal force from said reservoir to the bearing surfaces of said crankpin and said connecting rod bearing, and a return conduit extending from the outer surface of said crankpin to said reservoir for returning oil to said reservoir; said connecting rod bearing having associated therewith means for collecting oil escaping from said bearing surfaces in the form of a hollow ring surrounding said crankpin and open toward said crankpin, said hollow ring having therein a plurality of partitions dividing the hollow space in said ring into a plurality of separate chambers, said partitions having flanges thereon partially closing the open inner side of said ring.

3. A device as described in claim 1, wherein a guide member is secured to said crankpin inside of said hollow means, said guide member having two openings to receive oil discharged from said hollow means and to conduct said oil to said return conduit, said return conduit being in the form of a tube passing transversely through said crankpin and having an exit opening in said reservoir.

4. In a device of the class described, a crankpin mounted to revolve about an external axis, a connecting rod bearing within which said crankpin is journalled, said crankpin having an oil reservoir therein, a supply conduit for conducting oil flowing under the influence of centrifugal force from said reservoir to the bearing surfaces of said crankpin and said connecting rod bearing, and a return conduit extending from the outer surface of said crankpin to said reservoir for returning oil to said reservoir; said connecting rod bearing having fixed to one end thereof hollow means open towards the crankpin for collecting oil from said bearing surfaces and means provided with at least one inwardly extending wall for guiding the collected oil to a position where it will flow by centrifugal force to said return conduit, said return conduit being adapted to admit the oil returning under centrifugal force into said reservoir, means for packing that end of said bearing remote from said oil collecting means, said bearing having one or more channels therein opening at one end inside of said packing and at the other end opening into said collecting means, said channels being inclined outward from the axis of said crankpin in the direction toward said collecting means.

5. A device as described in claim 1, wherein said reservoir is in the form of an axial bore in said crankpin and is closed at the outer end of the crankpin by an end wall provided with an oil charging hole fitted with a screw plug.

6. A device as described in claim 1, wherein said reservoir is in the form of an axial bore in said crankpin and is closed at the outer end of the crankpin by an end wall provided with an oil charging hole fitted with a screw plug, said screw plug having a pressure equalizing hole therethrough.

7. A device as described in claim 1, wherein a strainer is provided in said reservoir between said return conduit and said supply conduit.

8. A device as described in claim 1, wherein said reservoir is in the form of an axial bore in said crankpin and is closed at the outer end of the crankpin by an end wall provided with an oil charging hole fitted with a screw plug, and a strainer positioned in said reservoir between said return conduit and said oil charging hole on one side and said supply conduit on the other side.

9. A device as described in claim 1, wherein said oil collecting means is mounted on the side of said bearing at the outer end of said crankpin and has joined thereto a cap covering the entire outer end of said crankpin.

10. In a device of the class described, a crankpin mounted to revolve about an external axis, two connecting rod bearings positioned coaxially on said crankpin, said crankpin having an oil reservoir therein, supply conduits for conducting oil flowing under the influence of centrifugal force from said reservoir to the bearing surfaces of said crankpin and each of said connecting rod bearings, and a return conduit extending from the outer surface of said crankpin to said reservoir for returning oil to said reservoir; a hollow oil collecting member located between said bearings and surrounding said crankpin, said oil collecting member being fixed to one of said bearings and packed with respect to the other of said bearings, said oil collecting member being adapted to intercept oil escaping from the bearing surfaces of each of said bearings and said crankpin and being open toward said crankpin and having at least one inwardly extending wall to move the intercepted oil into a position where it will flow by centrifugal force to said return conduit, said return conduit being adapted to admit oil returning under centrifugal force to said reservoir.

11. A device as described in claim 10, wherein each of said bearings has fixed to its end remote from said oil collecting means, packing means adapted to block oil escaping from the bearing surfaces at said remote ends, said bearings being provided with channels inclined to the axis of the crankpin for conducting the blocked oil to said collecting means.

12. A device as described in claim 1, wherein a guide member is secured to said crankpin inside of said hollow means, said guide member having an opening to receive oil discharged from said hollow means toward said crankpin and to conduct said oil to said return conduit.

13. In a device of the class described, a crankpin mounted to revolve about an external axis, a connecting rod bearing within which said crankpin is journalled, said crankpin having an oil reservoir therein, a supply conduit for conducting oil flowing under the influence of centrifugal force from said reservoir to the bearing surfaces of said crankpin and said connecting rod bearing, said crankpin having two diametrically opposite channels therein substantially tangent to the crank circle of the crankpin and both extending from the outer surface of the crankpin into said reservoir, said connecting rod bearing having associated therewith hollow means for collecting oil escaping from said bearing surfaces, said hollow means being open to the crankpin at its inner side and being provided with at least one inwardly extending wall to catch the collected oil therein and to move the collected oil to a position where it will flow by centrifugal force inwardly toward said crankpin, and a guide member secured to said crankpin inside of said hollow means, said guide member having two openings to receive oil discharged from said hollow means toward said crankpin and to conduct the oil to said channels, said channels being adapted to admit the oil returning under centrifugal force to said reservoir.

14. In a lubricating device, a crankpin mounted to revolve about an external axis, a connecting rod bearing within which said crankpin is journalled, said crankpin having an oil reservoir therein, a supply conduit for conducting oil flowing under the influence of centrifugal force from said reservoir to the bearing surfaces of said crankpin and said connecting rod bearing, and a return conduit extending from the outer surface of said crankpin to said reservoir for returning oil to said reservoir; means operative during rotation of said crankpin to moving oil centrifugally thrown towards the outer surface of said crankpin, from a point more remote from said external axis than the axis of said crankpin, to a point between said external axis and said crankpin, from which said oil can flow by centrifugal force into said return conduit, said return conduit being adapted to admit the oil returning under centrifugal force to said reservoir.

ERICH BURMEISTER.